(No Model.) 2 Sheets—Sheet 1.

W. WHITE.
CENTRIFUGAL AMALGAMATOR.

No. 368,363. Patented Aug. 16, 1887.

WITNESSES:
F. McArdle.
C. Sedgwick

INVENTOR:
W. White
BY Munn & Co.
ATTORNEYS.

(No Model.) 2 Sheets—Sheet 2.
W. WHITE.
CENTRIFUGAL AMALGAMATOR.

No. 368,363. Patented Aug. 16, 1887.

WITNESSES:
F. McArdle
C. Sedgwick

INVENTOR:
W. White
BY Munn & Co
ATTORNEYS.

UNITED STATES PATENT OFFICE.

WILLIAM WHITE, OF MOUNT VERNON, NEW YORK.

CENTRIFUGAL AMALGAMATOR.

SPECIFICATION forming part of Letters Patent No. 368,363, dated August 16, 1887.

Application filed April 15, 1887. Serial No. 234,919. (No model.) Patented in England January 11, 1887, No. 463.

*To all whom it may concern:*

Be it known that I, WILLIAM WHITE, of Mount Vernon, in the county of Westchester and State of New York, have invented a new and Improved Centrifugal Amalgamator, of which the following is a full, clear, and exact description.

This invention relates to centrifugal amalgamators of the class illustrated, described, and claimed in Letters Patent No. 355,958, granted on the 11th day of January, 1887, upon an application heretofore filed by me, the object of the present invention being to prevent the mercury carried by the revoluble pan from moving in a body to the extreme edge of the pan when said pan is rapidly revolved; and to this end the invention consists of a pan provided with a number of pockets, which are preferably produced by forming concentric ridges about the axis of the pan, all as will be hereinafter more fully described, and specifically pointed out in the claims.

Reference is to be had to the accompanying drawings, forming a part of this specification, in which similar figures of reference indicate corresponding parts in all the views.

Figure 1:
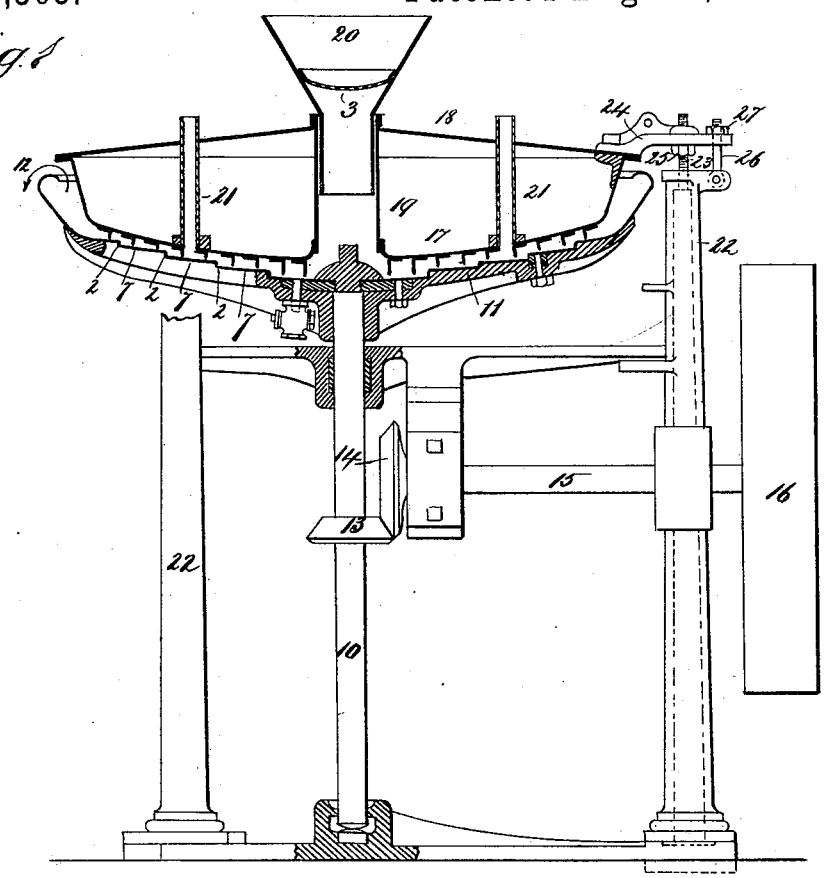
Figure 2:
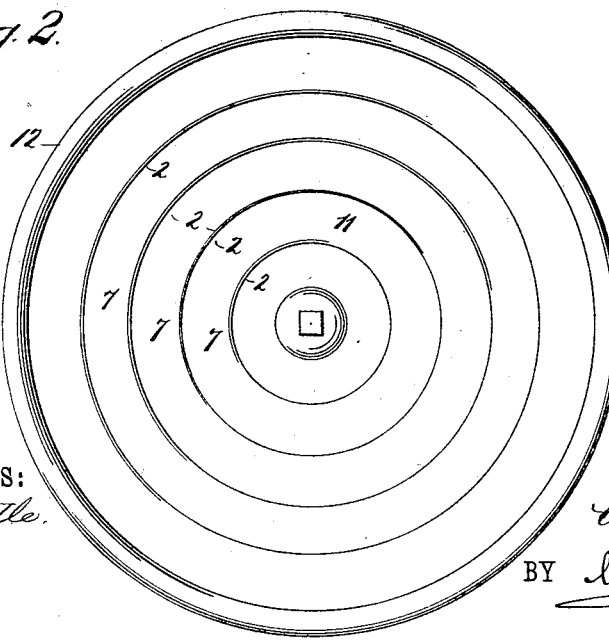
Figure 3:
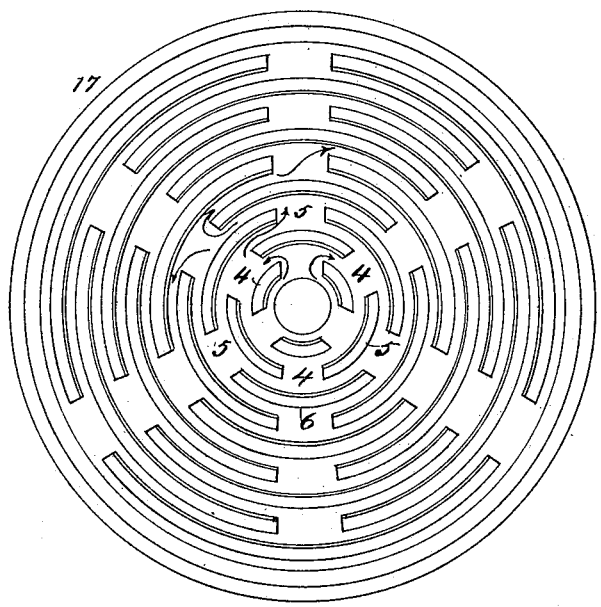

Figure 1 is a central sectional elevation of my improved form of centrifugal amalgamator. Fig. 2 is a plan view of the revoluble pan, representing the same as it appears when removed from the other portions of the machine; and Fig. 3 is an inverted plan view of the stationary disk that is arranged in connection with the pan.

In the drawings, 10 represents a vertical shaft, to which there is rigidly connected a pan, 11, formed with an inwardly-bent upper edge, 12, and with a series of ribs or shoulders, 2. The shaft 10 carries a bevel-pinion, 13, that is engaged by a bevel-gear, 14, carried by a horizontal shaft, 15, said shaft being arranged to be driven by any proper driving mechanism, but preferably through the medium of a belt that runs in engagement with a pulley, as 16, carried by the shaft.

Above the pan 11 there is mounted a disk, 17, in connection with which there is arranged a cover, 18. A feeding-tube, 19, leads upward from the center of the disk 17, and in the top of this tube there is fitted a hopper, 20, that is provided with a screen, 3, as shown in Fig. 1.

The lower face of the disk 17 is provided with an inner set of riffs or ridges, 4, preferably arranged so that they are concentric with the axis of the pan 11, above which they are arranged. Beyond the riffs 4 there is a second series of riffs, 5, which break joint with the riffs 4, a third set of riffs, 6, being arranged beyond the riffs 5, these riffs breaking joint with the said riffs 5, and this arrangement of riffs is continued onward toward the peripheral edge of the disk. Open tubes 21, that are in register with apertures formed in the disk 17, lead upward through the cover 18 and serve to prevent the formation of a vacuum between the disk 17 and the pan 11.

The disk 17 and the parts connected thereto are adjustably supported by columns 22, which columns carry upwardly-extending threaded standards 23, that pass through apertures formed in arms 24, that are rigidly connected to the disk-cover, while the columns 22 carry eyebolts 26, that may be turned up to enter slots formed in the ends of the arms 24. The threaded standards 23 carry nuts 25, which may be turned up or down to vary the distance between the edges of the riffs of the disk 17 and the upper surface of the pan 11, and a proper adjustment having been obtained the pan is locked to place by turning down nuts 27, that are carried by the bolts 26, as will be readily understood from the construction illustrated in Fig. 1. In practice three of the columns 22 are preferably employed.

The amalgamator described is applicable for use in the treatment of crushed ore or sand containing precious metals, whether such ore or sand be wet or dry.

In operation the ore is fed to the pan 11 from the hopper 20, such pan at this time being charged with mercury, which under the effect of the rapid rotation of the pan will fly toward the periphery of the pan and form a wall beneath the inwardly-turned flange 12 of the pan 11, portions of the mercury, however, being intercepted by the shoulders 2, such mercury resting in the recesses or pockets 7, that are formed by said shoulders. Then as the ore is fed to the pan it will gradually work outward toward the peripheral edge thereof, taking courses corresponding with those indicated by the arrows shown in Fig. 3, so that in traveling from the center of the pan to its edge the ore will be obliged to pass to and fro across the surface of the pan, the ore finally passing outward over the upper edge of the pan, as indicated by the arrows in Fig. 1.

Disregarding the formation of the pan 11, the construction above described is substantially the same as that illustrated and claimed in the patent above referred to; but I have found in practice that very much better results are obtained in the treatment of the ore by means of such a pan as the one illustrated in the drawings forming a part of this specification.

Having thus fully described my invention, I claim as new and desire to secure by Letters Patent—

1. The combination, with a pan formed with a series of shoulders and means for revolving the pan, of a disk provided with riffs arranged to break joint, substantially as described.

2. The combination, with a pan having recesses or depressions in its upper face and means for revolving the pan, of a disk provided with riffs arranged to break joint, substantially as described.

3. The combination, with a pan formed with a series of depressions or recesses and means for revolving the pan, of a disk provided with riffs upon its lower face, and tubes which register with apertures formed in the disk and extend upward therefrom, substantially as described.

4. The combination, with a pan formed with shoulders 2, of means, substantially as described, for revolving the pan, and a disk provided with riffs that are arranged to break joint, said disk being adjustably mounted above the pan, substantially as described.

WILLIAM WHITE.

Witnesses:
EDWARD KENT, Jr.,
EDGAR TATE.